UNITED STATES PATENT OFFICE.

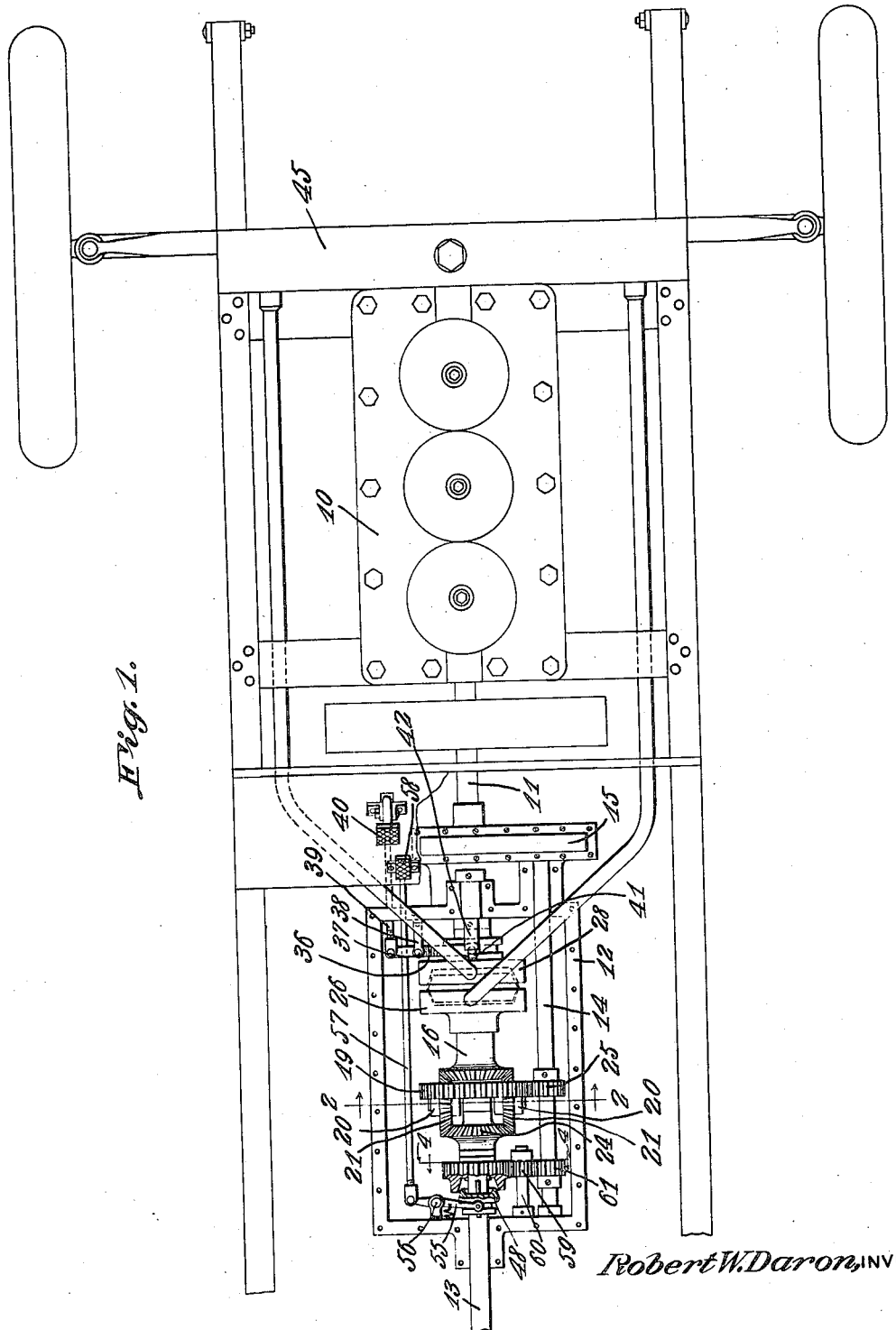

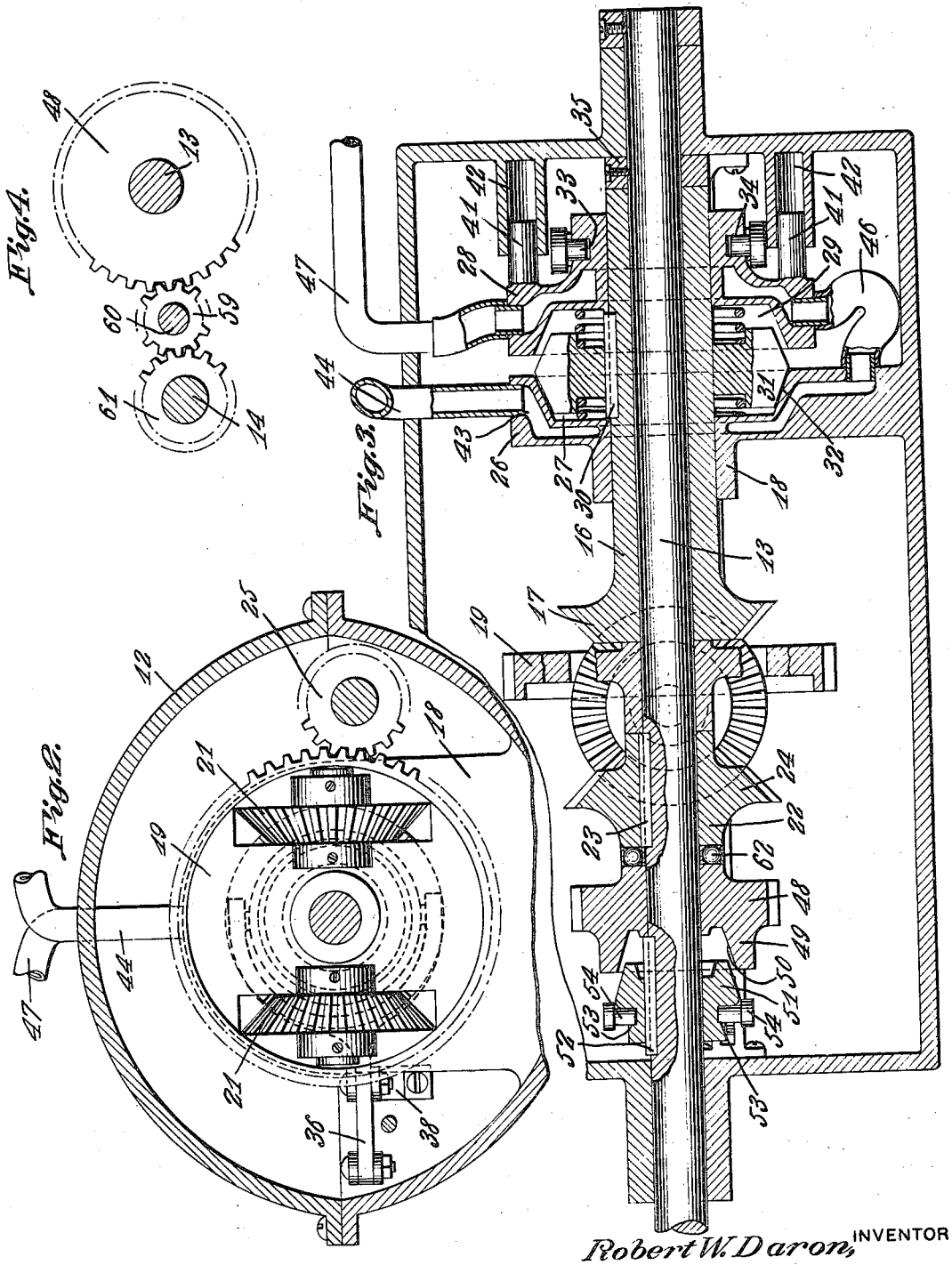

ROBERT WM. DARON, OF YORK, PENNSYLVANIA.

TRANSMISSION DEVICE.

1,259,369.

Specification of Letters Patent.

Patented Mar. 12, 1918.

Application filed April 11, 1917. Serial No. 161,287.

*To all whom it may concern:*

Be it known that I, ROBERT W. DARON, a citizen of the United States, residing at York, in the county of York and State of Pennsylvania, have invented certain new and useful Improvements in Transmission Devices, of which the following is a specification.

This invention has relation to transmission devices for motor vehicles or the like, and has for an object to provide a transmission for imparting various speeds to the driving axle of a motor vehicle, without the use of different sets of gears of various ratios as have been heretofore deemed necessary.

Another object of the invention is to provide a transmission device for motor vehicles capable of transmitting power at different rates of speed, said device including an element operating upon the differential principle in connection with a braking device whereby minute changes of speed may be obtained from a direct drive to a standstill.

A still further object of the invention is to provide a transmission device having the above named characteristics and a reverse gearing associated therewith whereby a reverse drive of the vehicle may be obtained as well as forward.

A still further object of the invention is to provide means in a transmission device having the above named characteristics and including a braking clutch, of means whereby the clutch may be cooled and a low temperature maintained to prevent overheating.

In addition to the foregoing my invention comprehends improvements in the details of construction and arrangement of parts to be hereinafter more fully described and particularly set forth in the appended claims.

In the accompanying drawings in which similar and corresponding parts are designated by the same characters of reference throughout the several views in which they appear:

Figure 1, is a view in plan of a portion of a motor vehicle chassis, illustrating the embodiment therein of my transmission.

Fig. 2, is a transverse section taken on the line 2—2 of the preceding figure.

Fig. 3, is a longitudinal section taken through the casing of my improved transmission, and Fig. 4, is a detail view in section illustrating the reversing gears, and taken on the line 4—4 of Fig. 1.

With reference to the drawings 10 indicates, diagrammatically the engine of a motor vehicle, 11 the power shaft thereof, and 12 the casing of my improved transmission, said casing being located in the frame of the vehicle substantially in the location at present employed in standard motor vehicles. The propeller shaft indicated at 13 is adapted for transmitting power to the differential of the vehicle, said power shaft 13 being disposed substantially in longitudinal alinement with the power shaft 11 of the engine, although not necessarily so, the transmission including a counter shaft 14 journaled at opposite ends in the transmission casing in parallelism to the shaft 13. The counter shaft 14 is designed to be rotated continuously by the power shaft of the engine, that is as long as the clutch of the vehicle is in engaging position, the power being transmitted from said engine shaft to the shaft 14 through the medium of gearing which may be contained within a suitable housing indicated at 15.

A sleeve 16 surrounds the shaft 13 within the transmission case, said sleeve being of a length approximately one-half the length of the case and is formed upon its ends located substantially intermediate the ends of the transmission case with a bevel gear 17, the sleeve being journaled for rotation in a bearing 18 formed integrally or otherwise with the transmission case forming a part which is stationary relative thereto. A spur gear 19 is mounted upon the shaft 13 adjacent the bevel gear 17 and is adapted for rotation relative to said shaft, the gear 19 having formed upon one face diametrically opposed pairs of apertured ears 20, suitably spaced to receive between each pair a bevel gear 21. The bevel gears 21 are mounted upon short shafts which penetrate the ears 20, and both of said gears 21 are adapted for meshing engagement at all times with the gear 17. A sleeve 22 is mounted upon the shaft 13 and is locked thereto for rotation therewith through the medium of a key 23, said sleeve being located opposite the sleeve 16 and is similarly provided with a bevel gear 24 which is also in constant meshing engagement with the bevel gears 21. It will be obvious from the foregoing that through the combination of the gears 17, 19, 21 and 24, a differential gearing is provided in effect and which, as will be subsequently seen serves to transmit infinite variations of speed to the shaft 13 from the engine.

The counter shaft 14 is provided with a gear 25 which is in constant meshing engagement with the above mentioned spur gear 19 of the differential and it will thus be noted that if the counter shaft 14 is in motion its movement will be transmitted to the spur gear 19 which will carry the bevel gears 21 in an orbital movement about a propeller shaft. The effect of such movement will however be later explained.

A locking clutch is provided which includes a receptive member 26 which is formed upon the above mentioned bearing 18, said member 26 having a conical recess 27 therein similar to the penetrative member of the usual cone clutch. The cone shaped recess 27 is concentric relative to the drive shaft 13 and a second receptive member 28 is mounted upon the sleeve 16 in opposed relation relative to the receptive member 26, said member 28 being similarly provided with a cone shaped recess 29 adjacent to and in direct opposition to the cone shaped recess 27 of the clutch member 26. The member 28 however is loosely mounted upon the sleeve 16, and is adapted for longitudinal sliding movement thereupon. A penetrative member 31 is provided between the receptive members 26 and 28 and is adapted to move within the recesses 27 and 29 thereof, said penetrative member being fixed to the sleeve 16 through the medium of a key 30. The penetrative member 31 is formed at opposite peripheral edges with a double bevel 32 which is complementary to the peripheries of the recesses 27 and 29 for frictional engagement therewith.

The receptive member 28 is formed with a central enlargement 33 having an annular groove 34 in which pins 35 of a bifurcated shipper lever 36 extend. The shipper lever 36 is fulcrumed as at 37 at a point intermediate its ends to a bracket 38 secured interiorly to the transmission case, the opposite extremity of the said lever 36 is pivotally connected through the medium of a link 39 to a foot pedal 40 which is pivotally mounted upon the floor of the car within reach of the driver's foot whereby when said pedal 40 is oscillated, the receptive member 28 may be moved longitudinally upon the sleeve 16. The penetrative member 38 is furthermore provided with a pair of laterally extending integrally or otherwise formed lugs 41 which are normally engaged between spaced lugs 42 formed interiorly upon the gear case whereby rotative movement of said member 28 is prevented, said lugs 41 and 42 however permitting sliding movement of said member 28 in the manner mentioned above.

The receptive members 26 and 28 are both of hollow formation and the interior thereof is in communication through the medium of an inlet, or an outlet as the case may be, indicated at 43 with a pipe 44 which is placed in communication at its other end with the radiator 45 of the motor vehicle. The interior of the receptive member 26 is connected at a point remote from the connection thereto of the pipe 44 with a short section of flexible tubing 46, said tubing being connected at its opposite end to the interior of the receptive member 28. The interior of the receptive member 28 being placed in communication at a point remote from the point of connection thereto of the member 46 with a pipe 47 which also is connected to the radiator of the car. It is obvious that the connection 47 must be of a flexible nature in manner similar to the connection 46 to permit sliding movement of the receptive member 28 of the brake clutch.

A reverse drive is provided which comprises a spur gear 48 loosely mounted upon the propeller shaft 13 at a point opposite the brake clutch just described, said spur gear 48 having formed upon one face an enlargement 49 formed with a cone shaped recess 50, forming the receptive member of a clutch. The penetrative member 51 is cone shaped and is fixedly secured to the propeller shaft through the medium of a key 52, said penetrative member having a circumferential groove 53 in which pins 54 of a shipper lever 55 penetrate. The shipper lever 55 is fulcrumed at 56 upon a bracket secured to the transmission case, the opposite end of said lever 55 being connected through the medium of a link 57 to a foot pedal 58 located adjacent the above mentioned foot pedal 40. It will be obvious that when the foot pedal 58 is depressed the penetrative member 51 may be shifted to engagement within the recess 50 of the spur gear 48 thereby locking said gear to the shaft 13 for rotation therewith. An idler gear 59 is mounted upon a shaft 60 secured within the crank case, said idler gear being adapted for constant meshing engagement with a gear 61 mounted upon the counter shaft 14. It will be obvious that with the penetrative member 51 out of engagement with the complementary member, the rotation of the counter shaft will be constantly transmitted through the medium of the idler gear 59 to the spur gear 48. Inasmuch as the gear 48 and sleeve 22 are adjacent in end to end engagement, friction therebetween may be relieved through the provision of balls 62 placed therebetween.

In operation, it will be obvious that the rotation of the counter shaft will be transmitted through the medium of its gear 25 to the gear 19 whereby the bevel gear 21 of the differential will be rotated in an orbital motion, and if the penetrative member 31 of the brake clutch is in a position mid-way between the receptive members and out of engagement with either, the sleeve 16 will be rotated idly through rotation of the gear 19. It will be obvious that owing to the friction of the differential of the rear axle, and other parts, the propeller shaft 13 as well as the gear 24 connected thereto will be held stationary, with the result that rotative movement of the sleeve 16 is produced as stated above.

However, should it be desired to impart, say a low speed to the propeller shaft preliminary to starting the vehicle, the pedal 40 is depressed whereby the receptive member 28 will be moved toward the member 26 thereby crowding therebetween the penetrative member 31, and the speed of rotation of the sleeve 16 will be somewhat reduced owing to the friction created between said penetrative member 31 and the stationary receptive members 26 and 28. The speed of rotation of the sleeve 16 being thus somewhat started, and the counter shaft rotating at its same rate, it will be obvious that portions of the differential included by the gears 19 and 21 will serve, owing to their orbital movement, to also impart a rotative movement to the bevel gear 24 and likewise to the propeller shaft 13. It will furthermore be obvious that as the speed of rotation of the sleeve 16 is further decreased the speed of rotation of the bevel gear 24 will be correspondingly increased until the penetrative member 28 is moved to the left to such an extent as to firmly engage and hold the double bevel member 31 against rotation, whereby the orbital movement of the gear 19 will be completely transmitted to the gear 24, thereby rotating the propeller shaft at the highest rate of speed possible with this arrangement. It will be obvious however, that a high rate of speed can be obtained by suitably proportioning the bevel gears 21 and 24, as well as the gears 19 and 25.

To secure a reverse drive, the pedal 58 is released so that no motion whatever is imparted to the propeller shaft 13 through the medium of the differential element of my transmission, whereupon the reverse pedal 14 is depressed to throw the clutch member 61 into engagement with its complemental member 48 whereupon the rotative movement of the counter shaft will be transmitted through the medium of the gears 60 and 48 to the propeller shaft in a direction reverse however from that imparted thereto through the medium of the differential element.

As considerable heat is engendered by friction between the receptive members of the brake clutch and the penetrative member disposed therebetween, it will be apparent that a low temperature thereof may be maintained through the agency of the cooling fluid circulated through the hollow interior of the clutch member, said fluid being cooled by circulation through the radiator. A pump of any suitable description may be provided for forcibly causing circulation of the water through the clutch members, or a gravity system may be employed, depending upon the wishes of the builder of the machine.

Having thus described my invention what I claim as new and desire to secure by Letters Patent is:

1. In a transmission, a driving shaft, a driven shaft, a differential mechanism mounted on the driven shaft, means for driving the orbitally moving members of the differential from the driving shaft, whereby said driving shaft may rotate without imparting motion to the driven shaft, and means for retarding or preventing orbital movement of said orbitally moving member of the differential mechanism whereby a transmission of motion between the driving and driven shafts may occur.

2. In a transmission, a driving shaft, a driven shaft, a differential mechanism mounted on the driven shaft comprising a gear fixed to the driven shaft, an opposed gear mounted on the driven shaft and rotatable relative thereto, a set of orbitally movable gears normally meshing with said first mentioned gears, a gear on the driving shaft rotating said orbitally moving gears whereby rotation of the driving shaft may occur without imparting movement to the driven shaft, and means for retarding or preventing orbital movement of said orbitally moving gears whereby said differential mechanism may be rotated as a whole and consequently the driven shaft.

3. In a transmission, a driving shaft, a driven shaft, a differential mechanism mounted on the driven shaft, including a bevel gear fixed to said driven shaft, a second bevel gear mounted on the driven shaft but rotatable relative thereto, a spur gear mounted on the driven shaft for rotation relative thereto, a plurality of bevel gears carried by said spur gear for meshing engagement with the first mentioned bevel gears, a gear on the driving shaft for engagement with said first mentioned spur gear, whereby the spur gear and gears carried thereby may be rotated bodily and in an orbit by rotation of the driving shaft without imparting motion to the driven shaft, and means for engaging the second mentioned bevel gear to retard or prevent motion thereof whereby the differential may be rotated bodily and consequently the driven shaft.

4. In a transmission a driving shaft, a driven shaft, a differential mechanism including orbitally movable gears mounted on the driven shaft arranged so that the driving shaft may rotate without imparting motion to the driven shaft, and means for retarding or preventing movement of the orbitally movable gears whereby motion may be transmitted from the driving to the driven shaft comprising a stationary clutch member, a complemental clutch member rotatable with the differential, and means for moving said complemental members toward engagement.

5. In a transmission, a driving shaft, a driven shaft, a differential mechanism including axially and orbitally movable gears mounted on the driven shaft adapted to be rotated by the driving shaft whereby rotation of said driving shaft may occur without imparting rotation to the driven shaft, and means for retarding or preventing movement of the orbitally movable gears whereby power may be transmitted from the driving to the driven shaft comprising a receptive clutch member rotatable bodily with said differential, a penetrative member complemental to said receptive member for movement in engagement therewith, a second receptive member adapted also for engagement with said penetrative member, and manually operable means for moving the second mentioned receptive member toward the penetrative member for crowding said penetrative member between both of said receptive members whereby the differential is held against orbital movement.

6. In a transmission, a driving shaft, a driven shaft, a differential element mounted on said driven shaft, comprising a bevel gear fixed thereto, a sleeve mounted on the driven shaft for rotation relative thereto, a second bevel gear carried by said sleeve, a spur gear mounted on the shaft between said bevel gears, a plurality of bevel gears carried by said spur gear for meshing engagement with said first mentioned bevel gear, a gear on the driving shaft for engagement with the spur gear, a receptive penetrative member forming a bearing for said sleeve and having a conical recess in one face, a double bevel member rotatable with the sleeve for engagement in said recess, a second receptive member having a recess to receive said penetrative member, and means for moving said second receptive member toward the first whereby to crowd the penetrative member therebetween to thereby retard or prevent rotation of the sleeve to permit transmission of motion from the driving to the driven shaft.

In testimony whereof I affix my signature in presence of two witnesses.

ROBERT WM. DARON.

Witnesses:
MARTHA J. RAFFENSBERGER,
HORACE BARTELS.